United States Patent Office 2,708,229
Patented May 10, 1955

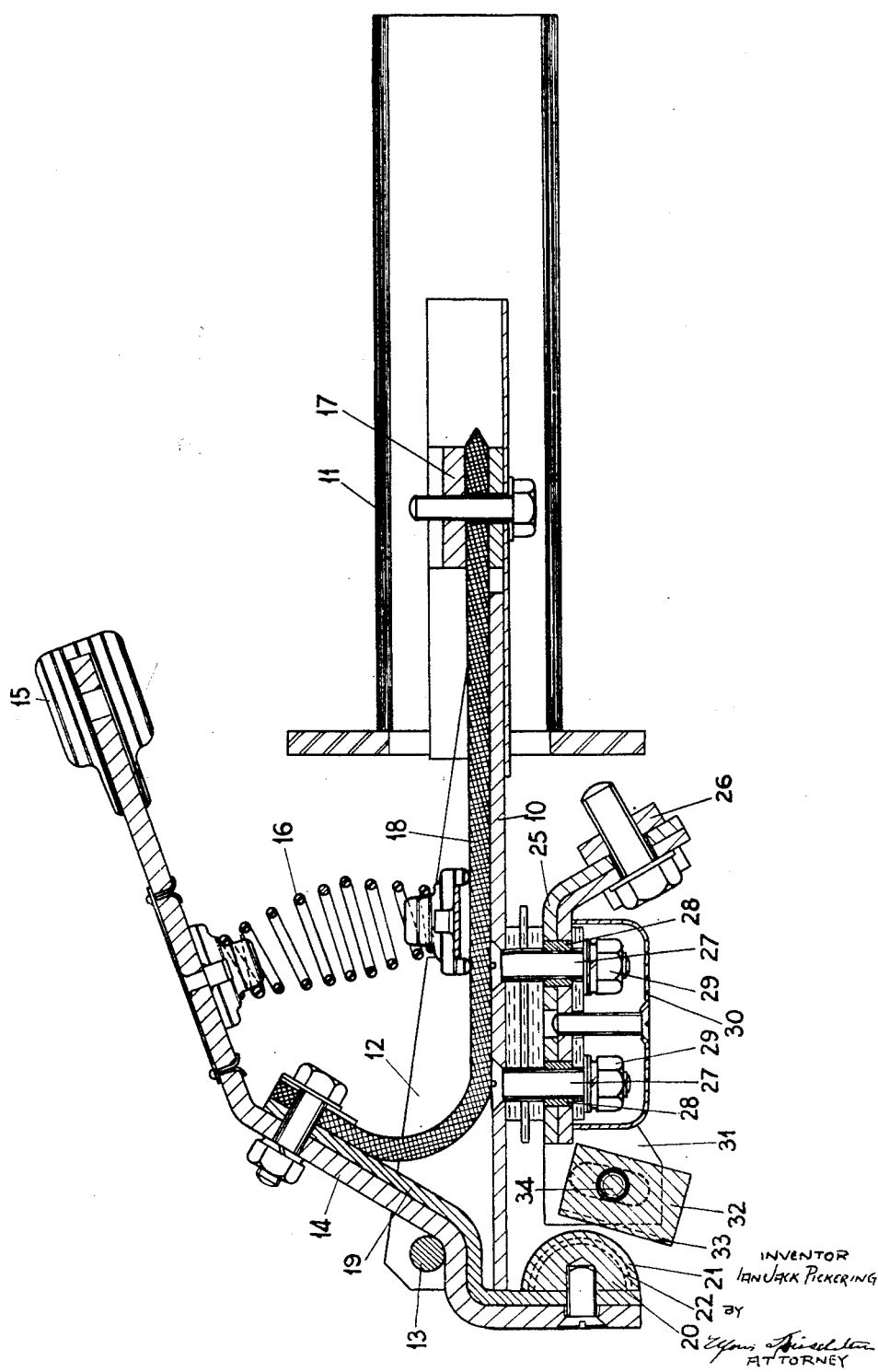

2,708,229

ELECTRODE HOLDERS FOR ARC WELDING

Ian Jack Pickering, Great Barr, Birmingham, England, assignor to The General Electric Company Limited, London, England Application February 5, 1953, Serial No. 335,322

4 Claims. (Cl. 219—8)

The present invention relates to electrode holders for arc welding and is especially concerned with holders for electrodes used in systems using two-phase welding current.

Where a two-phase supply has been employed for electric welding it has been found convenient to secure together the two welding electrodes so that they form a single mechanical structure but are, of course, insulated from one another electrically. The mechanical bonding of the two electrodes together can be effected for example by the use of the flux composition which normally surrounds the welding electrodes. Such electrodes will hereafter be referred to as double electrodes.

According to one aspect, the present invention may be considered as an improvement or modification of the invention disclosed in my copending patent application No. 249,901 filed October 5, 1951, now Patent No. 2,676,231, dated April 20, 1954, which discloses a welding electrode holder for use with two-phase welding current systems and comprising two arms electrically insulated from each other, one of said arms having at, or adjacent its extremity, a surface or surfaces adapted to engage the bared end of one of the electrodes of a double electrode while the other arm provides a fulcrum for a lever having one or more surfaces adapted to engage the bared end of the other electrode of the double electrode, and resilient means tending to urge said surfaces towards each other to engage and grip the bared ends of the electrodes of the double electrode between them. According to the present invention, in such an electrode holder, provision is made for angular adjustment of at least one of the surfaces adapted to engage the bared end of one of the electrodes so as to enable the holder to be adjusted to vary the angle between the arms of the holder and a welding electrode when held in the holder.

Provision may be made for adjusting the angular position of one of the surfaces arranged to engage the bared end of one of the electrodes through an angle which allows a welding electrode to be disposed at any desired angle to the arms of the holder between, say, 90° and 120° to the axis of the arms. It is of course necessary to make provision for securing the member providing the electrode engaging surface in the desired position of adjustment. Such securing may be effected by means of a screwed nut which can be tightened up to clamp said member when it has been disposed so as to hold an electrode when inserted in the holder in the desired position for the work which is to be undertaken.

According to another aspect of the present invention a welding electrode holder for use with two-phase welding current systems comprises an arm providing a fulcrum for a lever having one or more convex arcuate surfaces adapted to engage the bared end of an electrode, a member secured to and electrically insulated from said arm having a surface or surfaces adapted to engage the bared end of another electrode at, at least, two points so as to provide directional location for such an electrode, means for providing angular adjustment of said last mentioned surfaces so as to provide adjustment of said direction, and resilient means tending to urge said surfaces towards each other to engage and grip the bared ends of the electrodes.

The convex surface or surfaces provided on the lever may be in the form of one or more V-shaped grooves extending around a rounded block, for example a part-circular or semi-circular block of metal secured to the lever. The co-operating surface or surfaces may be in the form of a straight V-shaped groove or grooves extending along the face of a member and arranged to provide directional location for an electrode when engaged therewith. Said member providing directional location for the electrode engaged therewith is mounted so as to be capable of adjustment to alter the angular relationship between said member and the arm providing a fulcrum for the lever.

One form of construction in accordance with the present invention, will now be described by way of example with reference to the accompanying cross sectional drawing showing an electrode holder intended for use in a two-phase welding current system. The holder comprises an arm 10 to which a handle 11 is attached at one end. Towards its other end the arm 10 is provided with flanges 12 through which extends a pivot 13 forming a fulcrum for a lever 14 which carries at one end an insulated handle 15 which can be gripped to move the lever 14 towards the handle 11 against the action of a spring 16. An electrical connection 17 is provided within the handle 11 for connecting an electric cable from the welding supply to a flexible braid connection 18 for supplying welding current through a connection 19 to a block 20 mounted at the end of the lever 14 remote from the insulated handle 15, and providing a surface or surfaces for engaging the bared end of an electrode. The block 20 is of semi-circular cross-section and is proided with two circumferential V-shaped notches 21 and 22 of different depths arranged side by side. When held in the electrode holder the bared end of an electrode is arranged to lie in one or the other of said notches 21 or 22, the depth of notch being selected according to the size of the electrode to be used. The arm 10 providing the fulcrum for the lever may conveniently be made of metal and is arranged to be in electrical contact with the connection for supplying welding current to the block 20 at the extremity of the lever 14.

A short arm 25 providing a connection 26 to be joined to a cable connected to another line of the two-phase welding current supply is secured to the first mentioned arm 10 by means of bolts 27 which extend through insulating bushings 28 so as to provide electrical insulation between said first arm 10 and the short arm 25; nuts 29 on the bolts 27 are protected by a cover 30.

At its end remote from the handle the short arm 25 has side flanges 31 between which is clamped a block 32 having, on its surface directed towards the block 20 mounted at the extremity of the lever, two parallel straight V-shaped grooves 33 which are arranged to lie opposite the grooves 21 and 22 respectively provided in the block mounted on the lever so that when a groove in the block 20 engages the bared end of one electrode a groove in the other block 32 engages the bared end of the other electrode. The grooves 33 in the block 32 mounted on the short arm 25 are of sufficient length to provide directional location for an electrode when engaged therein. This direction can be altered by releasing the clamping means comprising bolt 34 and nut securing the block 32 to the flanges 31 of the short arm 25. The permitted movement of the block 32 may be such that the straight grooves 33 for engaging the bared end of an electrode can be swung from a position in which they extend generally perpendicular to the axis of the handle 11 to a position in which they extend at an angle of, for example 120° thereto. The curvature of the co-operating surfaces in the grooves 21 and 22 in the block 20 is sufficient to accommodate such adjustment. These angles are, of course, given by way of example only, and if desired provision may be made for adjustment of the block 32 through a wider range or through a different range of angles.

I claim:

1. A welding electrode holder for use with two-phase welding current systems comprising two arms electrically insulated from each other, one of said arms having at or adjacent its extremity, a surface adapted to engage the bared end of one of the electrodes of a double electrode, and to provide directional location for an electrode engaged therewith, the other arm providing a fulcrum for a lever having a surface adapted to engage the bared end of the other electrode of the double electrode, said first mentioned surface being angularly adjustable relatively to said first mentioned arm to vary the angle at which the double electrode is held relatively to said second arm, and resilient means tending to urge said surfaces towards each other to engage and grip the bared ends of the electrodes of the double electrode between them.

2. A welding electrode holder for use with two-phase welding current systems comprising two arms electrically insulated from each other, one of said arms having at or adjacent its extremity, a surface or surfaces having a V-shaped groove adapted to engage the bared end of one of the electrodes of a double electrode, and to provide directional location for an electrode engaged therein, the other arm providing a fulcrum for a lever carrying a rounded block having a V-shaped groove adapted to engage the bared end of the other electrode of the double electrode, said surface being angularly adjustable relatively to the first mentioned arm to vary the angle at which the double electrode is held relatively to said second arm, and resilient means tending to urge said surfaces towards each other to engage and grip the bared ends of the electrodes of the double electrode between them.

3. A welding electrode holder for use with two-phase welding current systems comprising an arm providing a fulcrum for a lever having a convex arcuate surface adapted to engage the bared end of one electrode of a double electrode, a member secured to and electrically insulated from said arm having a surface adapted to engage the bared end of the other electrode of the double electrode at at least two points so as to provide directional location for said double electrode, means providing angular adjustment of said last mentioned surface so as to provide adjustment of said direction, and resilient means tending to urge said surfaces towards each other to engage and grip the bared ends of the electrodes of the double electrode.

4. A welding electrode holder for use with two-phase welding current systems comprising an arm, a lever pivotally mounted on said arm and having a surface adapted to engage the bared end of an electrode of a double electrode, a member secured to and electrically insulated from said arm and having a surface adapted to engage the bared end of the other electrode of the double electrode at at least two points so as to provide directional location of such an electrode, means providing angular adjustment of said last mentioned surface so as to provide adjustment of said direction, and resilient means tending to urge said surfaces towards each other to engage and grip the bared ends of the electrodes of the double electrode between them.

References Cited in the file of this patent

UNITED STATES PATENTS

| | | |
|---|---|---|
| 1,316,334 | Schneider | Sept. 16, 1919 |
| 1,360,017 | Rappold et al. | Nov. 23, 1920 |
| 2,213,306 | Del Beue | Sept. 3, 1940 |
| 2,379,777 | Zeilstra | July 3, 1945 |

FOREIGN PATENTS

| | | |
|---|---|---|
| 301,660 | Great Britain | Dec. 6, 1928 |